United States Patent [19]

Tupper et al.

[11] Patent Number: 4,949,363
[45] Date of Patent: Aug. 14, 1990

[54] BOTTOM SUPPORTED LIQUID METAL NUCLEAR REACTOR

[75] Inventors: Robert B. Tupper, Greensburg; James D. Mangus, Hempfield Township, Westmoreland County; John E. Sharbaugh, Bullskin Township, Fayette County; Gedney B. Brown, Wilkins Township, Allegheny County; Julie M. Livingston, North Huntingdon; Asfandiar K. Dhalla, Latrobe, all of Pa.

[73] Assignee: Westinghouse Electric Corp., Pittsburgh, Pa.

[21] Appl. No.: 325,758

[22] Filed: Mar. 20, 1989

Related U.S. Application Data

[62] Division of Ser. No. 95,989, Sep. 10, 1987, Pat. No. 4,859,402.

[51] Int. Cl.5 .............................................. G21C 19/00
[52] U.S. Cl. ..................................... 376/260; 376/214
[58] Field of Search ............... 376/260, 214, 280, 285, 376/289, 292, 293, 294, 402, 404, 461

[56] References Cited

U.S. PATENT DOCUMENTS

| 4,036,688 | 7/1972 | Golden et al. | 376/280 |
| 4,045,286 | 8/1977 | Blum et al. | 376/360 |
| 4,495,137 | 1/1985 | Otsubo | 376/294 |
| 4,645,633 | 2/1987 | Hattori | 376/404 |
| 4,767,593 | 8/1988 | Wedellsborg | 376/294 |
| 4,859,402 | 8/1989 | Tupper et al. | 376/461 |

Primary Examiner—Daniel Wasil

[57] ABSTRACT

A liquid metal nuclear reactor has a sodium tank, having a closed arcuate bottom and upstanding cylindrical wall for containing a reactor core in a pool of liquid metal coolant, which is disposed in a guard tank having a bottom and upwardly extending cylindrical shell, and a support inside the guard tank adjacent the closed bottom of the sodium tank to support the two tanks in spaced relationship to each other. Support legs are also provided about the bottom periphery of the guard tank adapted to rest on a base mat of a reactor cavity. The bottom of the guard tank may be a closed arcuate shape, or the bottom may be a flat bottom wall that rests on the base mat with the cylindrical shell divided into two radially spaced sections, with a pool of lead-bismuth alloy provided on the bottom to seal the spaces between the two shell sections at the lower region thereof.

The pool of lead-bismuth alloy provided on the flat bottom wall of the guard tank contacts the bottom of the sodium tank to aid in preheating the same and providing a supporting and dampening effect therefor.

5 Claims, 7 Drawing Sheets

BOTTOM SUPPORTED LIQUID METAL NUCLEAR REACTOR

This is a division of application Ser. No. 07/095,989, filed Sept. 10, 1987, now U.S. Pat. No. 4,859,402.

CROSS REFERENCE TO RELATED APPLICATIONS

Reference is hereby made to two copending United States applications which deal with related subject matter and are assigned to the assignee of the present invention:

"An Improved Nuclear Reactor Plant Construction" filed in the name of Frank G. Gallo et al., on Apr. 19, 1984 as Ser, No. 602,232 (W.E. 51,923)now abandoned; and "Improved Nuclear Reactor Construction with Bottom Supported Reactor Vessel", filed in the name of John E. Sharbaugh, on Nov. 6, 1985 as Ser. No. 795,592 (W.E. 52,898); now U.S. Pat. No. 4,681,731;

The contents of both said applications incorporated by reference herein.

BACKGROUND OF THE INVENTION

The present invention is to a nuclear reactor, and more specifically, to a liquid metal nuclear reactor that provides bottom support for the closed bottom tank or reactor vessel that contains the liquid metal coolant, nuclear core and associated equipment.

DESCRIPTION OF THE PRIOR ART

A liquid metal-cooled nuclear reactor (LMR), like other nuclear reactors, produces heat by fissioning of nuclear materials which are fabricated into fuel elements and assembled within a nuclear reactor core situated in a reactor vessel. The heat produced by the LMR is used to generate elecricity. A typical energy conversion process for the LMR, being similar to that of most commercial nuclear reactors, involves transfer of heat from the reactor core to a primary coolant flow system, therefrom to a secondary coolant flow system and finally into steam from which electricity is generated.

In the LMR, a reactor coolant, such as liquid sodium, is circulated through the primary coolant flow system. A typical primary coolant flow system comprises the reactor core, a heat exchanger and a circulation pump. In a "pool" type system, the nuclear reactor core, the heat exchanger and the circulation pump are located within a large pool of coolant housed within a single vessel, whereas, in a "loop" type system, the heat exchanger and circulation pump are removed from the vessel housing the reactor core and relocated normally in separate vessels.

Generally, there are several heat exchangers and circulation pumps associated with the reactor core. The heat generated by the core is removed by the reactor coolant which flows into the core supporting structure and through the reactor core. The heated reactor coolant then flows through the heat exchangers which transfer the heat to secondary flow systems associated therewith. The cooled coolant exits from the heat exchangers and flows to a circulation pump which again circulates the coolant to the core supporting structure, repeating the described flow cycle, all of which is well known in the prior art.

Although liquid sodium has excellent heat-transfer properties and low vapor pressure at temperatures of interest for power generation, and is abundant, commercially available in acceptable purity and relatively inexpensive, making it an attractive medium as a reactor coolant, it does react violently with water which imposes severe problems in the design of sodium-to-water steam boilers. Therefore, reactor safety is a foremost design requirment. Due to the aforementioned characteristics of the preferred liquid metal coolant, sodium, the design must guard against the unlikely happening of loss of coolant around the reactor core. Coolant loss could result from the rupture of the reactor vessel or, in the core of a loop type system, rupture of one of the main coolant circulating lines.

Traditionally, most reactor vessels in LMRs are designed to be supported from the top of the vessel. These reactors operate at very high temperatures (up to 1000° F.) and as a result they experience large thermal expansions and can have substantial heat loss from the reactor vessel. The deck or vessel flange can be cooled, or a support can be provided which allows the vessel support and the reactor foundation to be near the same temperature, so that differential thermal expansions do not occur at the point where the reactor is anchored. Typical examples are the French Phoenix and Super Phoenix designs, and the U.S. FFTF and CRBR designs. These top-supported vessels, being suspended by their shell from the roof or top deck of the reactor, disadvantageously react to seismic loads like pendulums and develop high stresses in the shell near the top of the vessel. Furthermore, they amplify the loads applied to the reactor core within the vessel. This requires more structural material in the core to withstand the loads, resulting in a loss of neutron efficiency. Also, the reactor vessel, being suspended in place, is free to thermally expand downward, away from the support level. This latter characteristic is undesirable for certain accident scenarios in that as the vessel shell heats up, it expands downward moving the core away from the control elements associated therewith, thus leading to an unwanted increase in reactivity.

As described in U.S. Pat. No. 4,681,731, there have been previous reactor designs in which the reactor vessels were bottom supported. Such are, for example, represented by the bottom supported reactor designs disclosed in U.S. Patents to Wigner et al. (U.S. Pat. No. 2,810,689), Zinn (U.S. Pat. No. 2,841,545), Monson (U.S. Pat. No. 2,961,393), Nordheim et al. (U.S. Pat. No. 2,990,355), Stoops et al. (U.S. Pat. No. 3,007,859), Dix (U.S. Pat. No. 3,021,273), Arms et al. (U.S. Pat. No. 3,070,533), Koutz et al. (U.S. Pat. No. 3,072,549 and 3,120,471), Clifford et al. (U.S. Pat. No. 3,257,285), Lagowski (U.S. Pat. No. 3,303,098), Detman et al. (U.S. Pat. No. 3,393,127), Greischel et al. (U.S. Pat. No. 4,094,737) and Dauvergne (U.S. Pat. No. 4,313,795).

A further example of prior literature related to bottom supported reactor designs is in an article entitled "A Cold-Bottom Supported Vessel for Sodium-Cooled Reactors" by Didier Costes, in *Nuclear Technology*, Vol. 67, October 1984, pages 169–176. The Costes article illustrates and describes a variety of bottom supported reactor vessel designs and discusses the possible advantages thereof. The article then proposes a bottom supported vessel design which includes a bottom plate resting on an installation base mat by means of radially flexible supports and a horizontal thin upper flange described as a single-plane bellow extending outside of the upper hoop of the vessel shell and externally clamped to the periphery of the roof deck or slab.

Also, an article by R. K. Winkleblack, "Competitive Breeder Power Plants" August 1984, pp. 1–61 illustrates and describes a proposal for a liquid metal cooled nuclear reactor having a bottom supported reactor vessel in which a single primary tank of the reactor is supported from the bottom on high density magnesium oxide blocks. Also, the annulus around the primary tank is filled with large medium-density magnesium oxide blocks that are canned in thin sheet metal. The magnesium oxide serve as thermal insulation between the primary tank which contains hot sodium and the one-inch thick cavity liner that forms the inside surface of the concrete biological shield. This arrangement is supposed to allow the cavity liner to serve as a guard tank, eliminating the need for a separate one. The top of the primary tank tightly receives a central reduced diameter annular portion of the top deck. Redundant cooling coils, behind the one-inch steel liner, protect the concrete and keep it at 150° F. or less. The intent of the design is to support the primary tank in a way that will practically eliminate all significant tensile stresses in the tank due to its support and provide for gentle uniform restraint during an earthquake.

In U.S. Pat. No. 4,681,731, a bottom support concept is disclosed which improves the seismic response of the reactor, adds inherent safety features, and has the potential for significant cost reduction and shorter construction time. In the design of such a reactor, the problem of axial expansion of the reactor must be addressed. As described therein, a bellows is used to maintain a continuous primary boundary for the reactor system, and still accommodate the differential axial expansion between the hot reactor vessel and the cold reactor cavity wall which supports the reactor closure deck.

The objectives of a bottom supported liquid metal nuclear reactor system are to: reduce the amplification of imposed seismic loads on the nuclear core system; reduce the mass and size of the reactor system; provide enhanced inherent safety; provide a more uniform distribution of the system weight over the base mat; provide a less costly method of constructing large reactor systems, reduce cost, and minimize the need for reinforced concrete structures.

Among the requirements for a bottom supported liquid metal reactor system are:

1. The system must acommodate radial thermal expansion from construction temperature of 68° F. to operating temperatures of 700° F.

2. The bottom portion of the primary sodium boundary and the core support must accommodate an up transient in the cold sodium plenum due to loss of heat rejection in one intermediate heat exchanger.

3. The system must accommodate axial thermal expansion of the primary boundary from construction temperature of 68° F. to operating temperatures of up to 950° F.

4. The system must control the amount of heat loss from the bottom of the reactor.

5. The normal operating temperature of the concrete base mat below the system must not exceed 150° F.

6. All radial thermal expansions and contractions must occur in a manner that does not shift the reactor vertical centerline more than 0.06 inch from its true position.

7. The system shall be capable of sustaining lateral and vertical seismic loads without exceeded structural design limits of the materials used for construction.

8. The method of supporting the primary boundary shall be sufficiently independent of the containment boundary that a single accident cannot reasonably result in simultaneous failure of both boundaries.

9. The system must provide a method for continuous monitoring of the primary coolant boundary to preclude failure to detect a leak in the boundary that could result in the excessive loss of primary sodium from the boundary.

10. The system must allow the reactor to safely cycle through its normal range of temperatures without exceeding structural design limits.

The present invention provides a bottom supported liquid metal nuclear reactor system that meets the objectives and requirements above-stated.

SUMMARY OF THE INVENTION

An improved, bottom supported, liquid metal nuclear reactor has a generally cylindrical closed bottom tank, or sodium tank, for holding a pool of liquid metal coolant, the sodium tank having an arcuate bottom and cylindrical side wall, with a nuclear core supported in the liquid metal. The sodium tank is disposed in a guard tank that has a bottom and upwardly extending cylindrical shell and support means are provided inside the guard tank, adjacent the arcuate bottom wall of the sodium tank to support the same in spaced relationship to the guard tank when the sodium tank contains the pool of liquid metal. The guard tank is surrounded by a reactor cavity side wall and is adapted to rest on a refractory cover that is provided over a concrete base mat for the system.

In one embodiment of the present invention, the guard tank is suspended from a closure deck that extends across the open top to the sodium tank, which closure deck is supported by the reactor cavity side wall, and the guard tank has a closed arcuate bottom generally conforming to that of the sodium tank. The support means inside the guard tank is in the form of an inwardly extending ledge, secured to the inner wall of the guard tank, adjacent the periphery of the arcuate bottom wall of the sodium tank. The bottom wall of the guard tank has downwardly extending peripheral legs which are adapted to rest on the refractory bed of the base mat when the sodium tank contains liquid metal and is under heated, operating conditions. There may be provided a cylindrical metal barrier between the cylindrical shell of the guard tank that provides two annular chambers between the shell and the barrier, with the alternative that the closure deck be supported by the barrier. Thermal insulation is provided on the side of the barrier confronting the reactor cavity side wall, with steam generators, pumps and heat exchangers for the secondary liquid metal flow system of the reactor system provided in the annular space between the shell and the barrier to provide a compact nuclear steam supply system.

In a preferred embodiment of the present invention, the guard tank has a flat bottom which rests on the refractory bed, with the cylindrical shell separated into two sections, a lower section which extends upwardly from the flat bottom and contains a pool of lead-bismuth alloy, and an upper section which is supported by a closure deck and extends downwardly about the cylindrical wall of the sodium tank. The arcuate bottom of the sodium tank is in contact with the lead-bismuth which acts as a supporting and dampening means, and the lead-bismuth provides a seal between the upper and lower sections of the shell. A support ledge for the bottom of the sodium tank extends inwardly from the lower portion of the upper section of the shell, while legs are provided which depend downwardly from the upper section of the shell and are adapted to rest on the flat bottom wall of the guard tank. The metal barrier may also be provided to form the two annular chambers.

BRIEF DESCRIPTION OF THE DRAWINGS

The invention will be more fully understood by reference to the attached drawings, in which.

DETAILED DESCRIPTION

Figure 1:
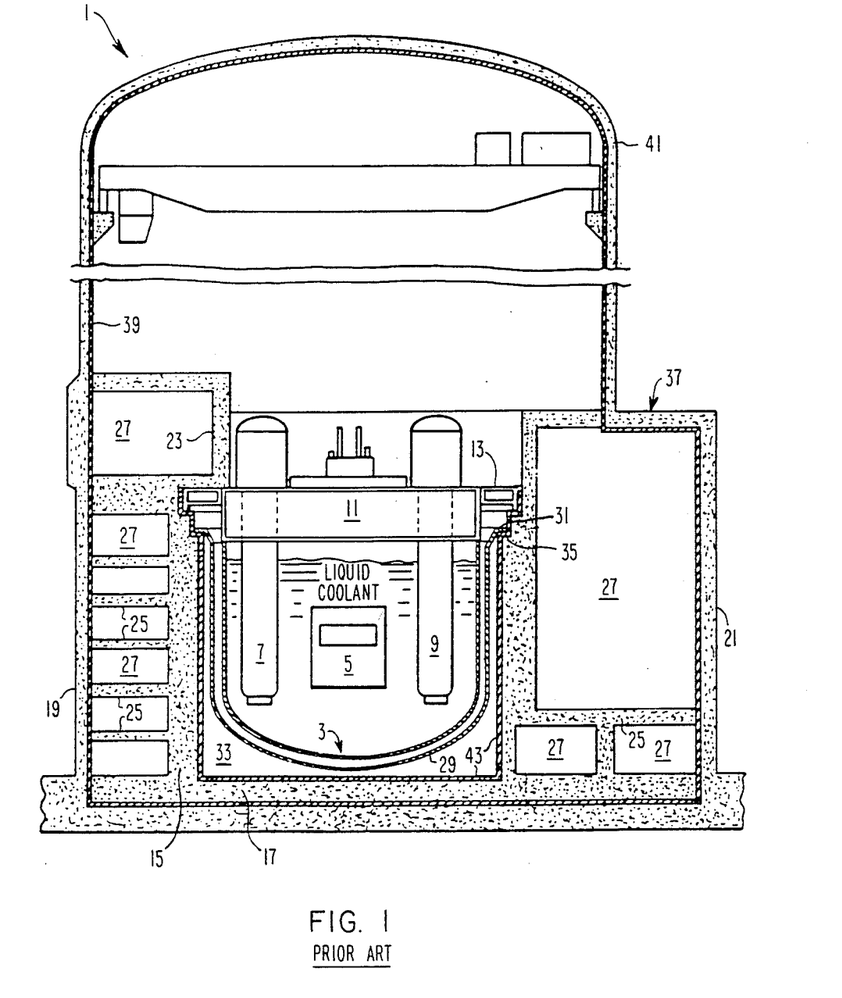
FIG. 1 is a simplified schematic vertical cross-sectional view of a conventional pool-type liquid metal reactor having a top suspended sodium tank.

The present invention is an improved liquid metal nuclear reactor that provides bottom support for the sodium tank or reaction vessel. A prior art liquid metal reactor plant 1 is schematically illustrated in FIG. 1, the plant being of the type fully described in the EPRI report number NP-1016-SY, Project 620-26, 27, dated March 1979 and entitled "Large Pool LMFBR Design, Executive Summary". As the plant is a complex structure, only a simplified version of the main components of the prior art plant, which are relevant to the improved plant construction, are illustrated in FIG. 1.

The prior art plant 1 is of the "pool" type which includes a closed bottom cylindrical vessel 3 in which there is contained a pool of liquid metal coolant, generally liquid sodium, and houses a nuclear reactor core 5, as well as heat exchanger 7 and circulation pump 9. The vessel 3 has an open top and is supported from a transverse deck 11 having a peripheral support ring 13 that is, in turn supported by a concrete cylindrical side wall or reactor cavity side wall 15, the reactor cavity side wall extending upwardly from a concrete base pad 17. Outer cylindrical vertical walls 19 and 21 and intermediate walls 23 are connected by horizontal walls 25 to the side wall 15 in a honeycomb fashion to provide a plurality of separate rooms 27 for housing various equipment associated with the reactor.

The liquid metal nuclear reactor 1 has a guard tank 29 that surrounds the closed bottom vessel 3. The vessel 3 is suspended in, and spaced from, the tank 29 and they are supported independently of each other, with the open top of the vessel 3 attached, such as by welding to the bottom of the transverse deck 11, with the deck 11 providing a seal for the vessel 3 for containment of reactor coolant metal, cover gas, fuel and other radioactive components. The guard tank 29 is an open top tank having an upper flange 31 by which it is suspended in the reactor cavity 33, defined by concrete side wall 15, from a lower annular vessel ledge 35 on the side wall. The tank flange 31 is fixed to the ledge 35 so as to withstand vertical seismic loads. As is seen from the drawing, the top of the vessel 3 is directly attached to the bottom of the transverse deck 11 and the guard tank 29 is attached to the upper portion of the side wall 15, such that the guard tank 29 does not provide a primary boundary between the contents of the vessel 3 and the external atmosphere.

A double boundary about the reactor is provided by use of a concrete containment building 37 which houses all of the plant 1 and includes a steel liner 39. The liner is exaggerated in thickness in FIG. 1 so as to be readily seen, and the same is spaced from the internal wall and the upper dome 41 of the containment building 37. Also, an inner steel liner 43 is provided slightly spaced from and adjacent the concrete side and base walls of the cavity 33, with a small gap provided between the liner and cavity walls. The spacing between liner 39 and dome 41, and between liner 43 and walls 15, 17 serve to impede transfer of heat from within the dome 41 to the concrete structure of building 37, and from the cavity 33 to the concrete base and walls 15, 17.

Figure 2:
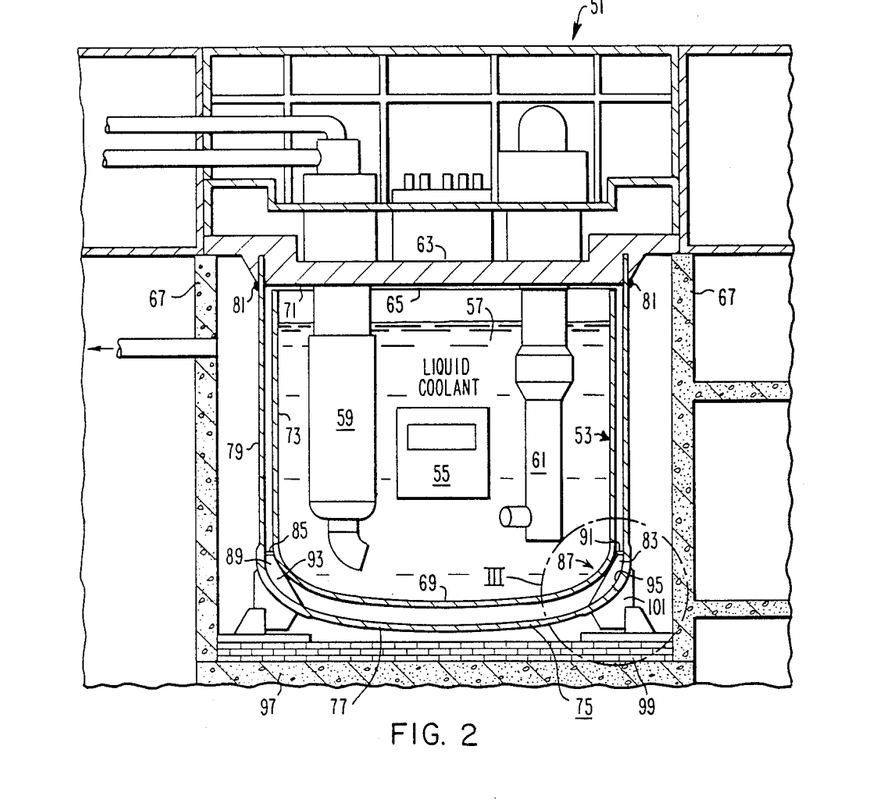
FIG. 2 is a vertical cross-sectional view of an embodiment of the present invention wherein an arcuately shape guard tank having a support means therein is provided.

An embodiment of the liquid metal nuclear reactor of the present invention is illustrated in FIG. 2. The reactor 51 has a closed bottom tank or sodium tank 53 which contains a nuclear core 55 supported therein in a bath of liquid metal coolant 57. As is conventional, one or more heat exchangers 59 and one or more circulation pumps 61 are also provided, which extend into the liquid metal pool. A closure deck 63 is provided which extends across the closed bottom tank 53 and is spaced therefrom. The closure deck 63 has a lower surface 65, and is supported by a reactor cavity side wall 67 which surrounds the reactor. The closed bottom tank 53 has an arcuate closed bottom wall 69, an open top 71 over which the closure deck 63 extends, and a cylindrical wall 73, which is spaced from the surface 65.

A guard tank 75 having an arcuate closed bottom wall 77, which generally conforms to the arcuate bottom wall 69 of the closed bottom tank, and a cylindrical shell 79 extending upwardly therefrom, surrounds the closed bottom tank, the cylindrical shell 79 secured, such as by welds 81, to the closure deck and depending therefrom. Support means 83, illustrated as an inwardly directed ledge 85, is provided adjacent the periphery 87 of the arcuate closed bottom wall 69 of the tank 53 for supporting the closed bottom tank in spaced relationship to the guard tank 75. The ledge 85 is fixed to the lower section 89 of the guard tank, such as by welding 91. A gusset 93 may be provided extending from the ledge 85 and secured to inner surface 95 of the guard tank arcuate closed bottom wall 77.

The guard tank 75, with the closed bottom tank 53 disposed therein is surrounded by the reactor cavity side wall 67 and vertically spaced from the base mat 97 which has a refractory bed 99 thereon. The refractory material forming the bed 99 is one having the desired density and thermal conductivity. A preferred material would have a compressive strength of about 5 kg/cm² and a thermal conductivity of about $8 \times 10^{-4}$ Cal/sec-cm²/cm-° C. A suitable material is kaolin firebrick.

A plurality of downwardly depending support legs (FIG. 3) 101 are provided about the periphery of the bottom wall 77 of the guard tank 75 which legs 101 are adapted to rest on the refractory bed 99 of the base mat 97 when the reactor is under heated operating conditions. The legs 101 are welded, as at 103, to the outer surface 105 of the guard tank and have a bearing surface or terminus 107. The legs 101 are vertically aligned with gussets 93 so as to provide additional support therefor. The legs 101 are positioned within a key way 109 to provide lateral support without restricting radial thermal expansion. Graphite blocks 110 may be positioned between the legs 101 and the refractory bed 99 for lubrication purposes.

Figure 3:
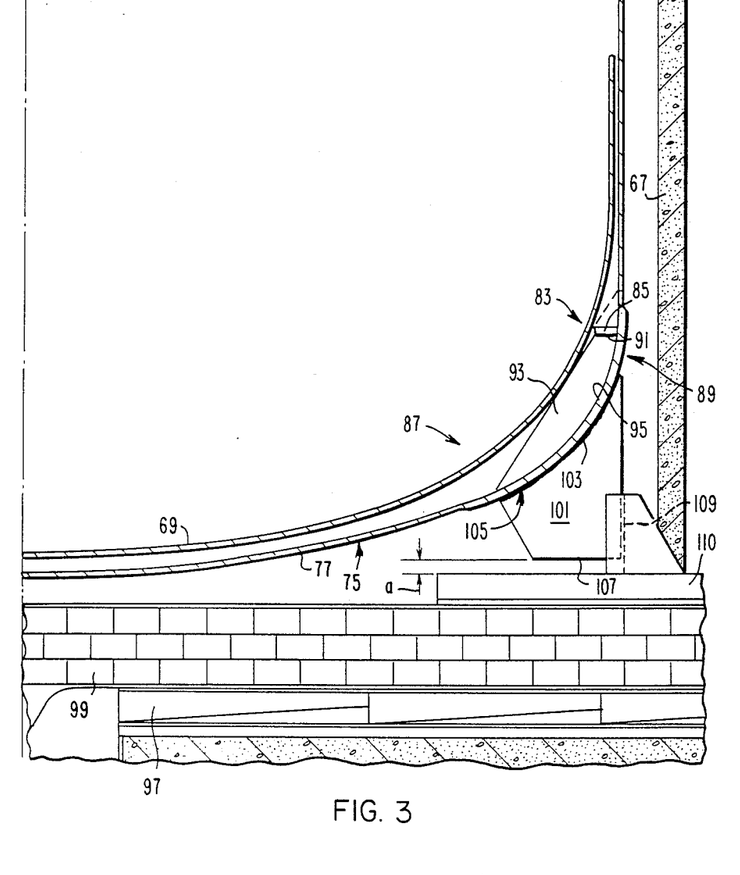
FIG. 3 is an enlarged section of the support means within the guard tank in the circle labeled III of FIG. 2.

In the liquid metal nuclear reactor 51, the closed bottom tank 53 is thus supported from the ledge 85 inside the guard tank 75. The cylindrical wall 73 extends upwardly from the ledge 85 and serves as the tank to contain the liquid metal coolant 57. The top of the tank 53 is open, and spaced from the lower surface 65 of the closure deck 63, such that the cylindrical wall 73 is free to expand or contract axially as the temperature of the primary coolant 57 changes. The guard tank 75 now becomes the primary system boundary and is suspended from the closure deck 63, while the closure deck is supported from the reactor cavity wall 67. An inert gas such as nitrogen is disposed in the area between the guard tank 75 and the reactor cavity wall 67. As shown in FIG. 3, a gap a between the bottom of legs 101 and the refractory bed provides a predetermined clearance between the bearing surface 107 of the legs and the support base refractory bed 99 when the reactor is installed in the reactor cavity. As the reactor is heated to standby temperatures, the guard tank 75 fully expands in both the radial and axial directions. The axial expansion results in reducing the gap a below the legs 101. When the reactor system reaches a predetermined temperature, such as 700° F., the gap a will be closed and the legs 101 will be resting on the refractory bed 99 of the base mat 97. As the reactor continues to heat up, the guard tank thermal expansion acts to reduce the tensile load in the cylindrical shell 79 of the guard tank 75. Further expansion places the shell in compression.

It is possible to control the maximum compressive stress in the guard tank shell to within acceptable structural limits by proper selection of the initial clearance and the temperature at which the weight of the reactor is transferred from the reactor cavity wall 67 to the reactor cavity floor, or base mat. The guard tank cylindrical shell 79 temperature is not subject to the rapid thermal transients which the closed bottom or sodium tank cylindrical wall 73 will experience because it is insulated from the sodium by a cover gas annulus which exists between the guard tank 75 and the sodium tank 53. The sodium tank cylindrical wall 73 on the other hand is free to expand or contract as the transients occur since it is not attached at the top end. This proposed configuration is particularly well suited for a bottom supported reactor system since it allows free radial expansion to occur before the bottom of the reactor is clamped to the bottom support bed. This design also retains the inherent safety features offered by a bottom supported reactor. The reactor system becomes bottom supported when at operating temperatures so that seismic events do not have a significant affect on the core assemblies or on control rod insertion action. The compressive strain capacity of the guard tank cylindrical shell 79 accommodates those thermal expansions which occur after the support legs 101 contact the refractory bed 99.

Figure 4:
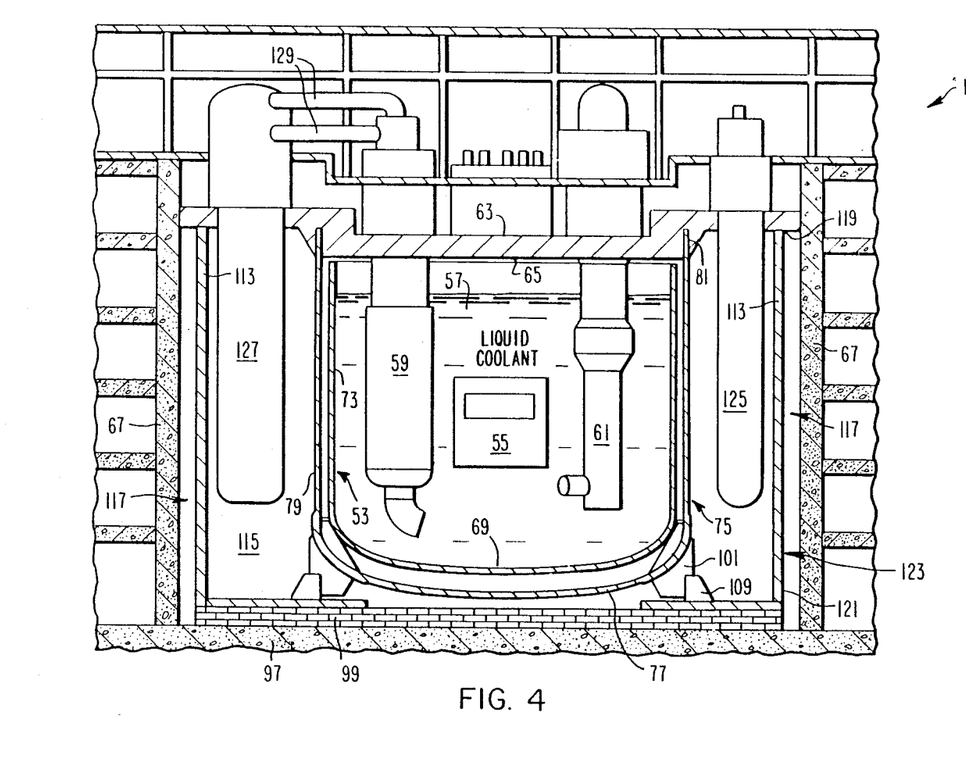
FIG. 4 is a vertical cross-sectional view of an embodiment similar to FIG. 2, wherein a barrier is provided between the guard tank cylindrical shell and the reactor cavity side wall so as to provide a pair of annular chambers therebetween.

In a further embodiment of the liquid metal nuclear reactor of the present invention illustrated in FIG. 4, the reactor 111 is similar to the embodiment of FIG. 2, except that a barrier 113 is provided between the guard tank cylindrical shell 79 and the reactor cavity side wall 67, and the closure deck 63 is supported by the barrier 113 rather than the reactor cavity side wall 67. The barrier 113 is a cylindrical metal barrier extending upwardly from the base mat 97 between and spaced from the cylindrical shell 79 of the guard tank 75 and the reactor cavity side wall 67 so as to provide a first annular chamber 115 between the cylindrical shell 79 and the barrier 113 and a second annular chamber 117 between the barrier 113 and the reactor cavity side wall 67. The closure deck 63 is supported by the top 119 of the metal barrier 113. A layer of thermal insulation 121 is provided on the surface 123 of the metal barrier 113, which confronts the reactor cavity side wall 67, in the second annular chamber 117. The secondary pumps 125 and steam generators 127 for the secondary circuit of the liquid metal reactor are contained within the first annular chamber 115, which will contain an inert gas such as nitrogen.

The liquid metal nuclear reactor 111 provides the configuration of a nuclear steam supply system where the secondary heat transport system and steam generators are positioned in the furnace-like first annular chamber 115 which surrounds the pool type liquid metal reactor. The entire nuclear steam supply system is bottom supported and requires only about one third the plant volume of a conventional design. In conventional systems, a cellular concept is used with placement of the reactor in a central area with each heat transport system or secondary circuit in individual cells with interconnecting piping. Every component and pipe in such a conventional system which contain liquid metal coolant must be heat traced, insulated and monitored to avoid freezing of the metal and plugging of the system.

With use of the metal barrier 113, a furnace-like first annular chamber 115 is formed in which secondary pumps 125 and steam generators 127, and all related piping are positioned. The outer surface 123 of the barrier has thermal insulation 121 thereon, such that the first annular chamber is heated by the reactor. The steam generator 127, in order to fit within the first annular chamber 115 should be of a special double wall tube and serpentine design. The steam generators 127 and intermediate heat exchangers 59 are supported at the same top elevation and connected by short pipes 129. Since the entire nuclear steam supply system is within a hot enclosed structure, no provisions for heat tracing are needed. The system is bottom supported on the refractory bed 99 to insulate the reactor and system heat from the base mat 97.

Figure 5:
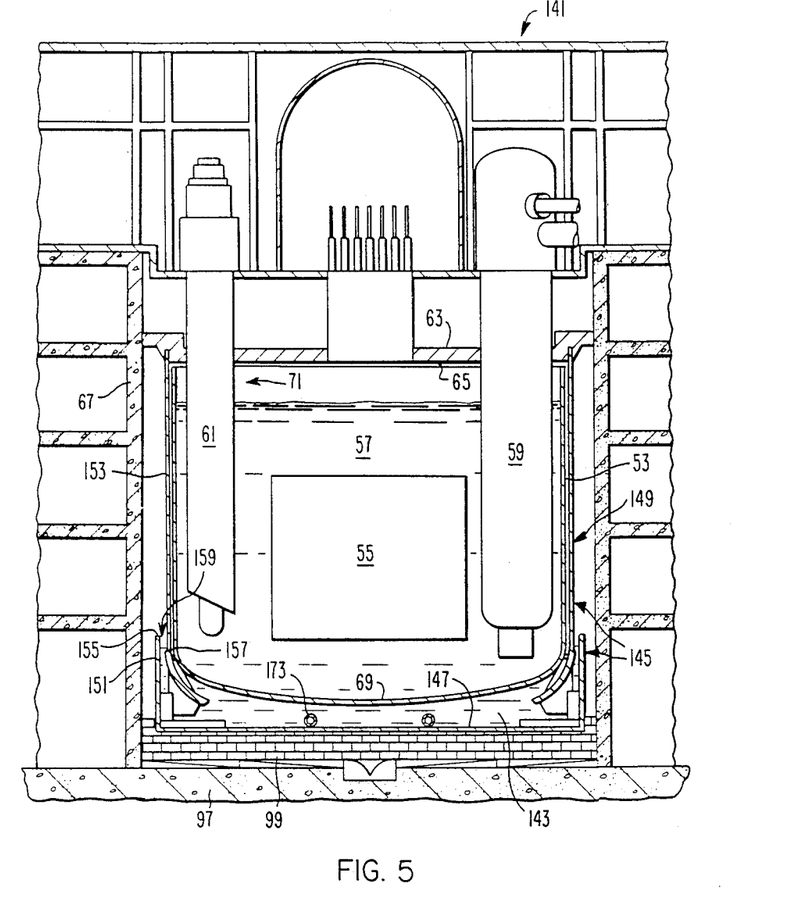
FIG. 5 is a vertical cross-sectional view of an embodiment of the present invention wherein a flat bottom guard tank is provided, with a pool of lead-bismuth on the flat bottom and in contact with the arcuate bottom of he sodium tank.

In a preferred embodiment of the liquid metal nuclear reactor of the present invention, the guard tank has a flat bottom which rests on the bed of refractory on the base mat, and a pool of lead bismuth is provided thereon in contact with the arcuate bottom of the closed bottom tank. Referring to FIG. 5, the liquid metal nuclear reactor 141 uses a pool of liquid lead-bismuth alloy 143 to assist in supporting the closed bottom tank and for providing a dampening effect for that tank in a seismic event. As illustrated, a closed bottom tank 53, containing a nuclear core 55 in a pool of liquid metal coolant 57 is positioned below a closure deck 63. A guard tank 145 is provided about the closed bottom tank 53, the guard tank having a flat bottom 147, which rests on the refractory bed 99 on base mat 97. The cylindrical shell 149 of the guard tank is divided into lower and upper sections, 151 and 153, respectively. The lower section 151 extends upwardly from the bottom wall 147 and has an upper edge 155. The upper section 153 of the cylindrical shell 149 is supported by the closure deck 63, which is, in turn, supported by the reactor cavity side wall 67. The upper section 153 is spaced inwardly from the lower section 151 and has a lower edge 157 that extends below the upper edge 155 of the lower section 151. A gap 159 is thus formed between the lower section 151 and upper section 153 of the cylindrical shell 145 into which liquid lead-bismuth alloy will flow to provide a seal therebetween. An inert gas such as argon or helium is disposed in the gap above the seal formed by the lead-bismuth alloy, while an inert gas such as nitrogen is disposed in the area between the guard tank and the reactor cavity wall 67. The arcuate bottom wall 69 of the closed bottom tank 53 contacts the lead-bismuth alloy 143 contained on the flat bottom wall 147, with a portion of the lead-bismuth alloy pool disposed in the gap 159.

Figure 6:
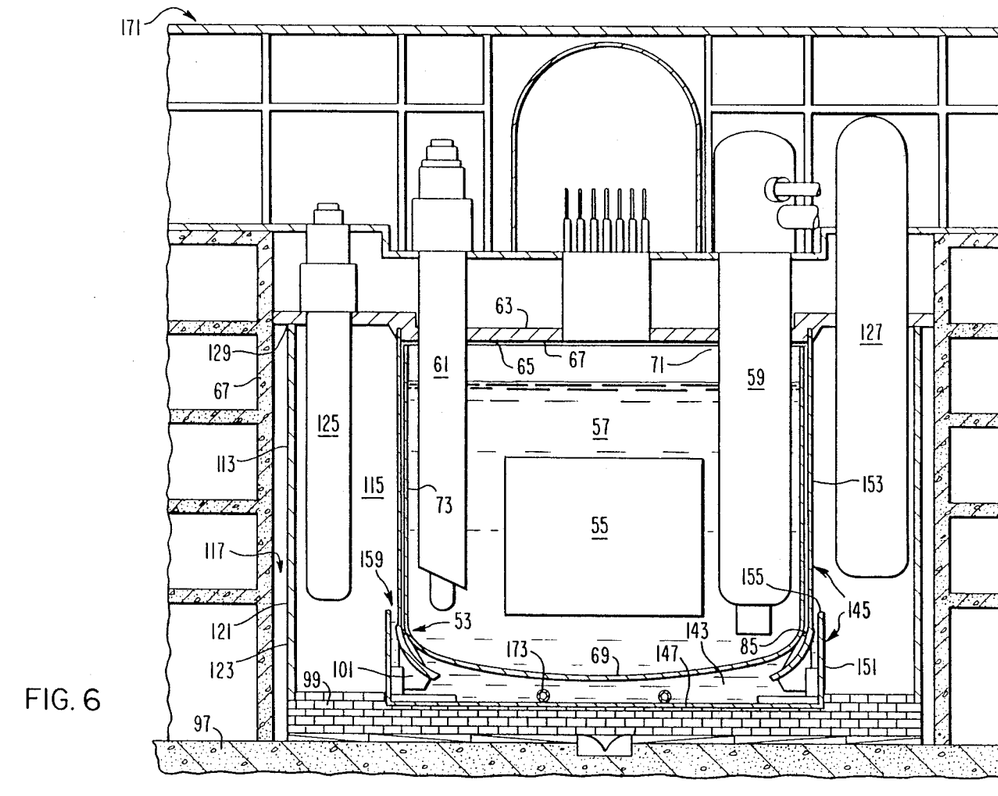
FIG. 6 is a preferred embodiment similar to that of FIG. 5 using the lead-bismuth pool and a barrier that divides the space between the cylindrical shell of the guard tank and the reactor cavity side wall into a pair of annular chambers.
Figure 7:
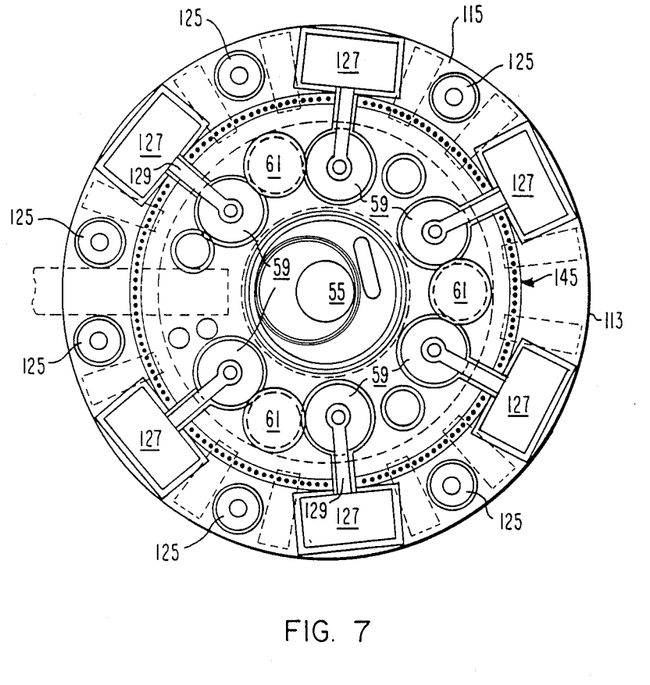
FIG. 7 is a top view, inside the barrier, of the embodiment illustrated in FIG. 6.

In the most preferred embodiment of the present invention, the use is made of a lead-bismuth pool in conjunction with use of a barrier. As illustrated in FIGS. 6 and 7, which has the same components as the embodiment of FIG. 5, with a barrier added, the liquid metal nuclear reactor 171 utilizes the flat bottom guard tank 145 with lower section 151 and upper section 153, as described in the description of FIG. 5, with a pool of lead-bismuth alloy provided on the flat bottom wall 147.

It is proposed that the entire liquid metal nuclear reactor illustrated in FIG. 6, for a 1,000 MWe plant, would fit in a right circular cylinder or barrier 113, having a diameter of 24 meters, a height of 17.5 meters, and a volume of less than 9,800 cubic meters. The reactor would have three primary coolant pumps 61, six intermediate heat exchangers 59, three direct reactor auxiliary cooling (DRAC) loops, six secondary coolant pumps 125, six double wall tube steam generators 127, and related piping and system auxiliaries. The primary boundary consists of the guard tank cylinder, the bottom of the reactor closure deck, and the bottom wall-contained lead-bismuth alloy pool, with the lead-bismuth alloy seal used at the bottom of the closed bottom tank 53 to accommodate the relative expansions which occur in the primary boundary. The flat bottom wall 147 of the guard tank would be 16.0 meters in diameter with the lower section 151 of the cylindrical shell extending upwardly about 3.3 meters. The lower section 151 has 26 radial key pads that interface with similar pads on the barrier. A number of heating means, such as electric heaters or steam heating coils 173 are positioned on the floor of the tank with feeder pipes passing upwardly along the inner tank wall and then into the first cavity. These coils are used to melt the lead-bismuth alloy during reactor assembly and during initial preheat of the reactor closed bottom tank prior to filing the same with liquid metal coolant. The upper section 153 of the cylindrical shell is 15.5 meters in diameter and 14.5 meters long. It is suspended from the reactor closure deck 63 and extends into the lead-bismuth alloy pool to close the boundary. The ledge 85 supports the bottom of the closed bottom or sodium tank 53, this tank having a bottom wall 69 of a torispherical shape with a head radius of 22.5 meters and a torus radius of 1 meter, and a cylindrical wall 73 which extends upwardly therefrom and terminates 300 millimeters from the bottom surface 65 of the closure deck 63. This cylinder is free to expand axially upwardly within the primary boundary as the sodium temperature in the hot plenum changes. The cylindrical wall 73 has a nominal 80 millimeter clearance with the cylindrical shell upper section 153 to provide a gap which is filled with reactor cover gas which helps to insulate the primary boundary shell from the sodium heat source. This small annular gap between the cylindrical shell upper section 153 and the cylindrical wall 73 represents the volume that would be filed as the result of a sodium leak, a very small volume in comparison with other liquid metal nuclear reactor designs, and means that the sodium inventory needed for accident conditions is much less. The largest reduction in the inventory is due to the absence of a void space below the sodium tank, which in the present invention is filled with lead-bismuth alloy.

The use of a lead-bismuth alloy (Pb—Bi) as a buffer at the bottom of the closed bottom tank 53 facilitates the thermal expansions, transfers the weight of the sodium coolant to the base mat 97, and acts as a hydraulic damper for the sodium tank under seismic loading. With the pool of lead-bismuth alloy in contact with the arcuate closed bottom wall 69 of tank 53, the hydrostatic load of the sodium 57 is balanced by the hydrostatic load from the lead-bismuth alloy 143 outside the closed bottom tank. With the lead-bismuth alloy 143 contained on the flat bottom wall 147 of the guard tank 145, the total weight of the primary coolant 57 is directly transferred to the refractory bed 99 on the base mat 97 as a uniform pressure load. Furthermore, the closed bottom tank 53 is free to expand in both the radial and axial direction without resistance by shearing or displacing the supporting lead-bismuth alloy. In addition to transferring the weight of the sodium directly to the base mat, the lead-bismuth alloy acts as a hydraulic damper during seismic events to laterally support the arcuate closed bottom wall 69 of the tank 53.

A lead-bismuth alloy is used because it is compatible with sodium, it has a low melting point of between about 200° to 300° F., and a very high boiling point. The high density of the lead-bismuth alloy, in excess of 600 pounds per cubic foot, provides the desired hydrostatic load with a very low head, and its thermal properties are well suited for this application. The lead-bismuth alloys preferred, ones having the desired melting point, are in the range of about 40 to 50 weight percent lead and about 60 to 50 weight percent bismuth. A particularly useful alloy is one having about 45 percent lead and 55 percent bismuth, which has a melting point of about 255° F. and a density of 640 pounds per cubic foot.

These alloys are solid at room temperature but liquid at the temperatures to which they are exposed during operating of the liquid metal nuclear reactor. The alloy would be initially placed on the flat bottom wall 147 as a layer of alloy blocks, with the legs 101 of the upper cylindrical shell section 153 of the guard tank 145 resting on the blocks. The lead-bismuth alloy would then be heated, by an external source such as by the use of enclosed steam or electric heaters 173, to melt the alloy blocks to a liquid. Such heating would also be effective to aid in preheating the closed bottom tank 53 prior to initial filling with liquid metal coolant, such as sodium.

What is claimed is:

1. The method of preheating the closed bottom of a sodium tank of a liquid metal nuclear reactor for charging of liquid sodium to the confines thereof, comprising:
   providing a supply of solid lead-bismuth alloy adjacent to the closed bottom of said sodium tank outside the confines of said sodium tank;
   heating said solid lead-bismuth alloy to melt the same and form a heated pool of liquid lead-bismuth alloy while contacting said heated pool with the closed bottom of said sodium tank to heat the same; and
   adding sodium to the confines of said sodium tank having a heated bottom resulting from said contact with the heated pool of liquid lead-bismuth alloy.

2. The method as defined in claim 1 wherein said lead-bismuth alloy has a melting point of between about 200° to 300° F. and a density in excess of 600 pounds per cubic foot.

3. The method as defined in claim 2 wherein said lead-bismuth alloy has a lead content of about 40 to 50 percent by weight and a bismuth content of about 60 to 50 percent by weight.

4. The method as defined in claim 3 wherein said lead-bismuth alloy is an alloy containing about 45 percent lead and 55 percent bismuth, by weight, and a melting point of about 225° F.

5. The method as defined in claim 1 wherein additional liquid lead-bismuth alloy is added to said heated pool after formation thereof from said solid lead-bismuth alloy.

* * * * *